United States Patent
Lecue et al.

(10) Patent No.: US 10,417,502 B2
(45) Date of Patent: Sep. 17, 2019

(54) CAPTURING SERIES OF EVENTS IN MONITORING SYSTEMS

(71) Applicant: Accenture Global Solutions Limited, Dublin (IE)

(72) Inventors: Freddy Lecue, Dublin (IE); Alvaro Henrique Chaim Correia, Sao Paulo (BR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/844,149

(22) Filed: Dec. 15, 2017

(65) Prior Publication Data
US 2019/0188484 A1    Jun. 20, 2019

(51) Int. Cl.
| | | |
|---|---|---|
| G06K 9/00 | (2006.01) | |
| G06K 9/62 | (2006.01) | |
| G06N 3/08 | (2006.01) | |
| H04N 7/18 | (2006.01) | |
| G06N 3/04 | (2006.01) | |

(Continued)

(52) U.S. Cl.
CPC ..... *G06K 9/00771* (2013.01); *G06F 16/2264* (2019.01); *G06F 16/9024* (2019.01); *G06K 9/6202* (2013.01); *G06N 3/04* (2013.01); *G06N 3/08* (2013.01); *H04N 7/181* (2013.01)

(58) Field of Classification Search
CPC ...... G06F 3/011; G06F 3/0304; G06F 3/0346; A63F 13/213; A63F 13/24; A63F 13/426; A63F 13/428; A63F 13/655; A63F 13/00; G06T 7/73; G06K 9/00221; G06K 9/00335; G06K 9/00369; G08C 17/00; G08C 17/02; H04N 5/2226
See application file for complete search history.

(56) References Cited

U.S. PATENT DOCUMENTS 6,894,714 B2 *  5/2005  Gutta .................. H04N 7/15
                                               348/14.05
9,436,895 B1     9/2016  Jones et al.
(Continued)

OTHER PUBLICATIONS

Castaldo et al "Target tracking using factor graphs and multi-camera systems", IEEE Transactions on Aerospace and Electronic Systems, IEEE Service Center, Piscataway, NJ, US. Col. 51, No. 3, Jul. 1, 2015, pp. 1950-1960.

(Continued)

*Primary Examiner* — Duy M Dang
(74) *Attorney, Agent, or Firm* — Fish & Richardson P.C.

(57) ABSTRACT

Implementations are directed to receiving a multi-dimensional data set including, for each device in a set of devices of a monitoring system, a feature set over a respective time period and over devices in the set of devices, processing multi-dimensional data to identify sets of features recorded by respective devices in the set of devices of the monitoring system, comparing a feature set of a first device relative to a feature set of a second device in a location dimension to determine that a first feature in the feature set of the first device corresponds to a second feature in the feature set of the second device, and providing a sequence of feature sets by selecting appropriate feature sets from the multi-dimensional data set based on the comparison, the sequence providing an order of progress of an object between the feature sets of the set of devices.

24 Claims, 6 Drawing Sheets

(51) Int. Cl.
    *G06F 16/22*     (2019.01)
    *G06F 16/901*     (2019.01)

(56) References Cited

U.S. PATENT DOCUMENTS

| | | | |
|---|---|---|---|
| 9,965,683 B2 * | 5/2018 | Verdejo | ............ G06K 9/00577 |
| 2007/0273696 A1 | 11/2007 | Cheng et al. | |
| 2008/0130949 A1 | 6/2008 | Ivanov et al. | |
| 2017/0155631 A1 | 6/2017 | Du | |
| 2017/0177947 A1 | 6/2017 | Citerin | |
| 2017/0294091 A1 | 10/2017 | Min et al. | |

OTHER PUBLICATIONS

Wu et al. "Knowledge Engineering with Big Data", IEEE Intelligent Systems, IEEE, US, vol. 30, No. 5, Sep. 1, 2015, pp. 46-55.
European Search Report in European Appln. No. EP18208047, dated Apr. 5, 2019, 10 pages.

* cited by examiner

CAPTURING SERIES OF EVENTS IN MONITORING SYSTEMS

BACKGROUND

Monitoring systems can include sensors, cameras, and the like to monitor, and record activities occurring within an environment. For example, a commercial site (e.g., a warehouse) can include cameras (e.g., fixed, mobile), and/or sensors that are responsive to activities occurring within, and/or around the commercial site. Recordings can be provided as digital recordings stored in computer-readable files (e.g., image files, video files, audio files). The length of a recording can span tens, hundreds, even thousands of hours. For example, a monitoring system can provide 24-hour recording of an environment, and resulting recordings can be stored days, weeks, months, and even years. Further, multiple recordings may be provided, each recording (or a set of recordings) from a respective recording device (e.g., camera) of the monitoring system.

In some instances, in response to an event, one or more recordings may be viewed in an effort to resolve the event. For example, if a product is lost during transit in a warehouse, recordings that may have captured the product's movement through the warehouse may be reviewed to help find the lost product. As another example, if an accident occurs, recordings may be reviewed to help understand the cause of the accident. However, the multiplicity of recordings, and the length of recordings can require time- and resource-intensive review to discover relevant sections of the recording(s).

SUMMARY

Implementations of the present disclosure are generally directed to capturing series of events in monitoring systems. More particularly, implementations of the present disclosure are directed to providing a sequence of data, and respective descriptions from a body of data recorded by a multi-device monitoring system.

In some implementations, actions include receiving at least a portion of a multi-dimensional data set corresponding to data recorded by the multi-device monitoring system, the multi-dimensional data set including, for each device in a set of devices of the multi-device monitoring system, a feature set over a respective time period and over devices in the set of devices, processing the at least a portion of multi-dimensional data to identify sets of features recorded by respective devices in the set of devices of the multi-device monitoring system, comparing a feature set of a first device relative to a feature set of a second device in a location dimension to determine that a first feature in the feature set of the first device corresponds to a second feature in the feature set of the second device, providing a sequence of feature sets by selecting appropriate feature sets from the multi-dimensional data set based on the comparison, the sequence providing an order of progress of an object between the feature sets of the set of devices, and generating a graph including a plurality of nodes, each node corresponding to a location, and including respective recorded data and a description. Other implementations of this aspect include corresponding systems, apparatus, and computer programs, configured to perform the actions of the methods, encoded on computer storage devices.

These and other implementations can each optionally include one or more of the following features: the multi-dimensional data set is provided based on feature extraction by processing the recorded data using a machine learning (ML) model; the ML model is provided as a convolution neural network (CNN); providing the sequence includes identifying a subsequent device based on a device, and a set of potential subsequent devices, each potential subsequent device being associated with a probability; the feature set of the first device is compared relative to the feature set of the second device in a time dimension to determine that a first feature in the feature set of the first device corresponds to a second feature in the feature set of the second device; the feature set of the first device is compared relative to the feature set of the second device using a machine learning technique; actions further include determining a location of the first device relative to a location of the second device using a knowledge graph; the respective recorded data includes an image captured by a respective device at the location; and the description is determined from the knowledge graph, and indicates the location.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
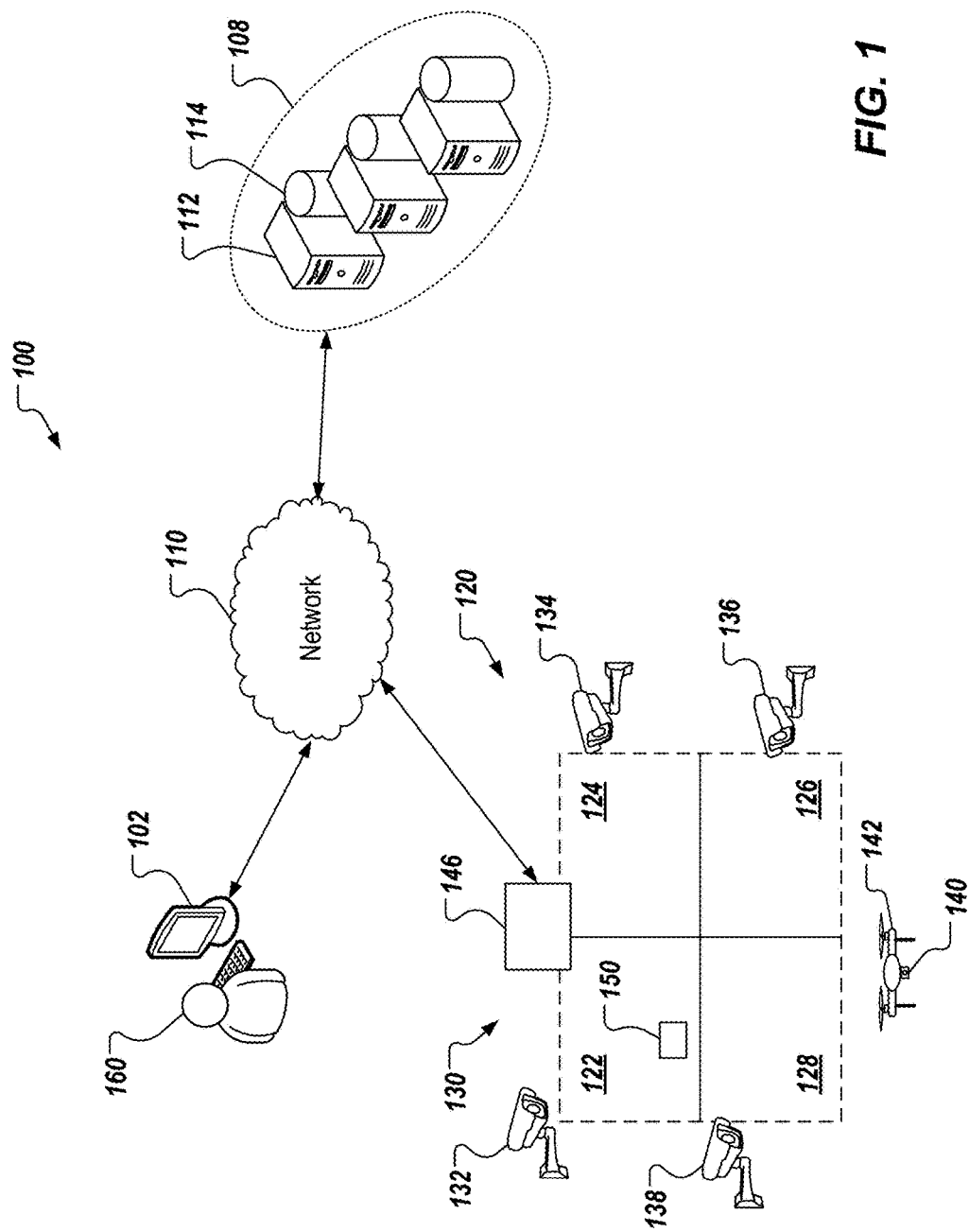
FIG. 1 depicts an example system that can execute implementations of the present disclosure.

Implementations of the present disclosure are generally directed to capturing a series of events in monitoring systems. More particularly, implementations of the present disclosure are directed to a sequence generation platform that provides a sequence of data, and respective descriptions from a body of data recorded by a multi-device monitoring system. Implementations include actions of receiving at least a portion of a multi-dimensional data set corresponding to data recorded by the multi-device monitoring system, the multi-dimensional data set including, for each device in a set of devices of the multi-device monitoring system, a feature set over a respective time period and over devices in the set of devices, processing the at least a portion of multi-dimensional data to identify sets of features recorded by respective devices in the set of devices of the multi-device monitoring system, comparing a feature set of a first device relative to a feature set of a second device in a location dimension to determine that a first feature in the feature set of the first device corresponds to a second feature in the feature set of the second device, providing a sequence of feature sets by selecting appropriate feature sets from the multi-dimensional data set based on the comparison, the sequence providing an order of progress of an object between the feature sets of the set of devices, and generating a graph including a plurality of nodes, each node corresponding to a location, and including respective recorded data and a description.

To provide context for implementations of the present disclosure, environments may be monitored by monitoring systems that can include sensors, cameras, and the like to record activities occurring within an environment. For example, a commercial site (e.g., a warehouse, an office building, an airport) can include cameras (e.g., fixed, mobile), and/or sensors that are responsive to activities occurring within, and/or around the commercial site. The recordings can be considered strategic, as they may contain useful information that can be used to resolve events, and/or improve efficiency, and/or security of the environment. However, relevant information provided in the recordings is often hidden among hundred, or even thousands of hours of recordings. Retrieving the relevant information can require time- and resource-intensive review of the recordings, which can be error prone (e.g., missing relevant information within the recordings).

In view of this, and as described in further detail herein, implementations of the present disclosure provide a sequence generation platform that leverages computer vision, and reinforcement learning to identify sequences of recorded data (e.g., images, sound) within recordings that capture an event, or at least a portion of an event of interest (e.g., an accident). In some implementations, based on an example recording, the sequence generation platform uses machine-learning to predict which component(s) of a monitoring system (e.g., camera(s)) are the most relevant at any given time, and builds a coherent sequence of images, and/or audio, that represents the event. In some implementations, a user can query the sequence generation platform for relevant portions of the recordings, and a sequence of data (e.g., images, and/or audio) is automatically identified and retrieved based on the machine-learning (ML) model, which are relevant to the queried event.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for executing predictive models, and interpreting results of predictive models in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

The example system 100 includes a site 120 having multiple locations 122, 124, 126, 128 therein. For example, the site 120 can include a commercial site, and the locations 122, 124, 126, 128 can include respective departments within the commercial site (e.g., manufacture, assembly, storage, shipping). In accordance with implementations of the present disclosure, the site 120 is monitored, and activities occurring therein are recorded by a monitoring system 130. In the depicted example, the monitoring system 130 includes fixed cameras 132, 134, 136, 138, and a mobile camera 140. In the depicted example, the mobile camera 140 is carried by a drone 142. It is contemplated, however, that a camera can be mobile by attachment to any appropriate mobile vehicle (e.g., fixed wing aircraft, wheeled vehicle, treaded vehicle).

In the depicted example, the monitoring system 130 includes a central unit 146 that is in communication (e.g., wired, wireless) with each of the fixed cameras 132, 134, 136, 138, and the mobile camera 140. For example, each of the cameras 132, 134, 136, 138, 140 can record images, video, and/or audio, and can provide the images, video, and/or audio to the central unit 146. In some examples, the central unit 146 can transmit the images, video, and/or audio to the back-end system 108 over the network 110 for processing in accordance with implementations of the present disclosure. In some implementations, the monitoring system 130 records movement of an entity 150 through the site 120. In some examples, the entity 150 can include an object (e.g., a package, a part, a pallet, a vehicle), and/or a person (e.g., an employee, a visitor).

In some implementations, the back-end system 108 hosts a sequence generation platform for capturing series of events from the images, video, and/or audio provided from the monitoring system 130. More particularly, the back-end system 108 can process the images, and/or video to provide a sequence of data, and respective descriptions. In some examples, the sequence of data, and respective descriptions can be provided for user review. For example, a user 160 can review the sequence of data, and respective descriptions on the computing device 102.

Implementations of the present disclosure are described in further detail herein with reference to an example context. The example context includes movement of an object through a commercial site. For example, the object can include a product that is moved through a manufacturing site. It is contemplated, however, that implementations of the present disclosure can be realized in any appropriate context. Other example contexts include movement of an entity through a site (e.g., retail site, airport, train station, shipping yard, home).

In accordance with implementations of the present disclosure, types, locations, and/or mobility of devices (e.g., the cameras 132, 134, 136, 138, 140 of FIG. 1) of a monitoring system (e.g., the monitoring system 130) are provided as a knowledge graph, or a portion of a knowledge graph. In short, a map of the monitoring system is provided within the knowledge graph.

In some examples, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

Figure 2:
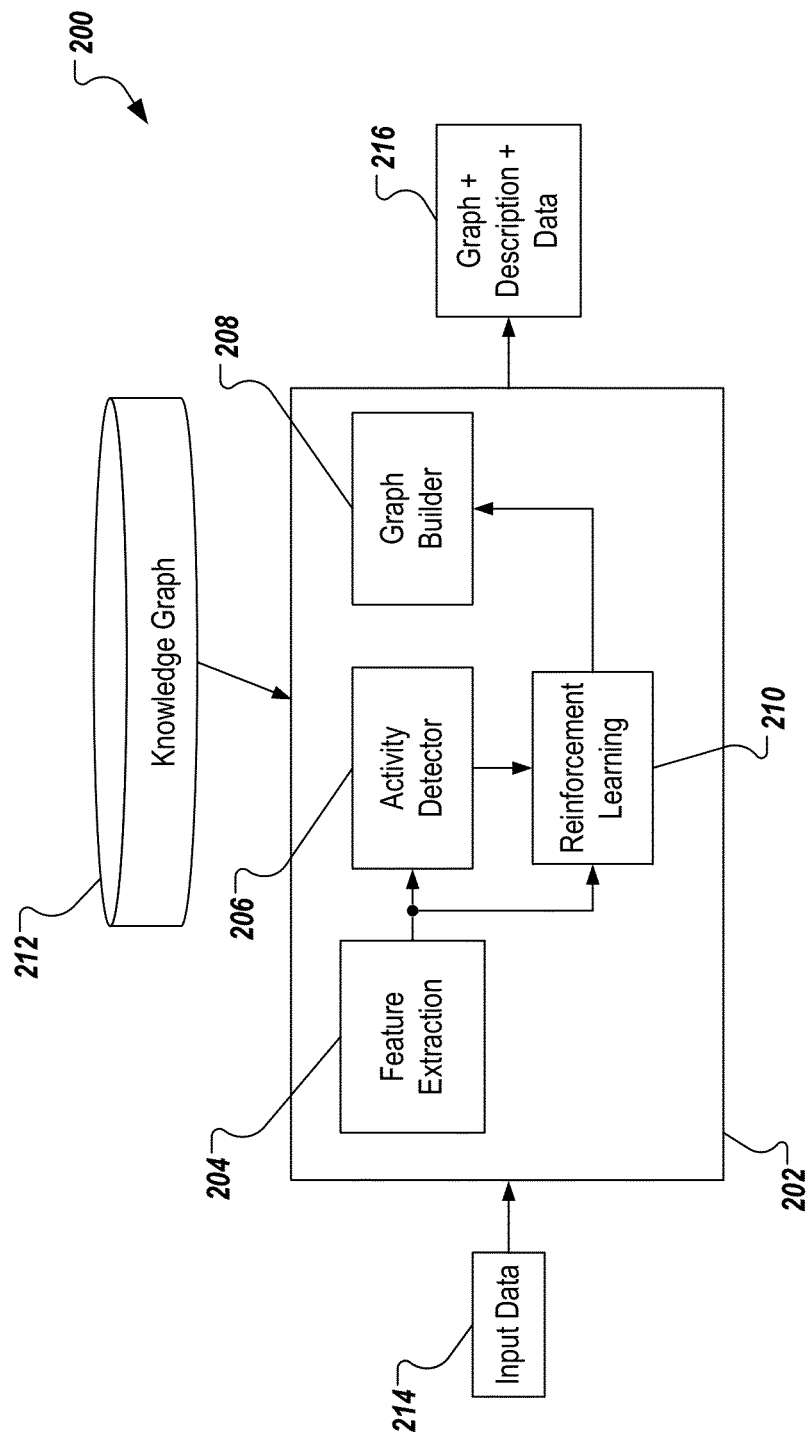
FIG. 2 depicts an example module architecture in accordance with implementations of the present disclosure.

FIG. 2 depicts an example module architecture 200 in accordance with implementations of the present disclosure. The example module architecture 200 includes a sequence generation platform 202 that processes input data 214 to provide output data 216. In some examples, the input data 214 includes a set of recorded data. In some examples, the set of recorded data includes recorded data provided from two or more components of a monitoring system (e.g., the monitoring system 120 of FIG. 1). In some examples, the set of recorded data is provided for a given period of time (e.g., 24 hours, 48 hours, 72 hours, week, month). In some examples, the output data 216 includes a sequence graph with associated descriptions based on a sub-set of the recorded data, as described in further detail herein. In the depicted example, the sequence generation platform 202 includes a feature extraction module 204, an activity detector module 206, a graph builder module 208, and a reinforcement learning module 210. The example module architecture 200 also includes a knowledge graph 212.

Figure 3:
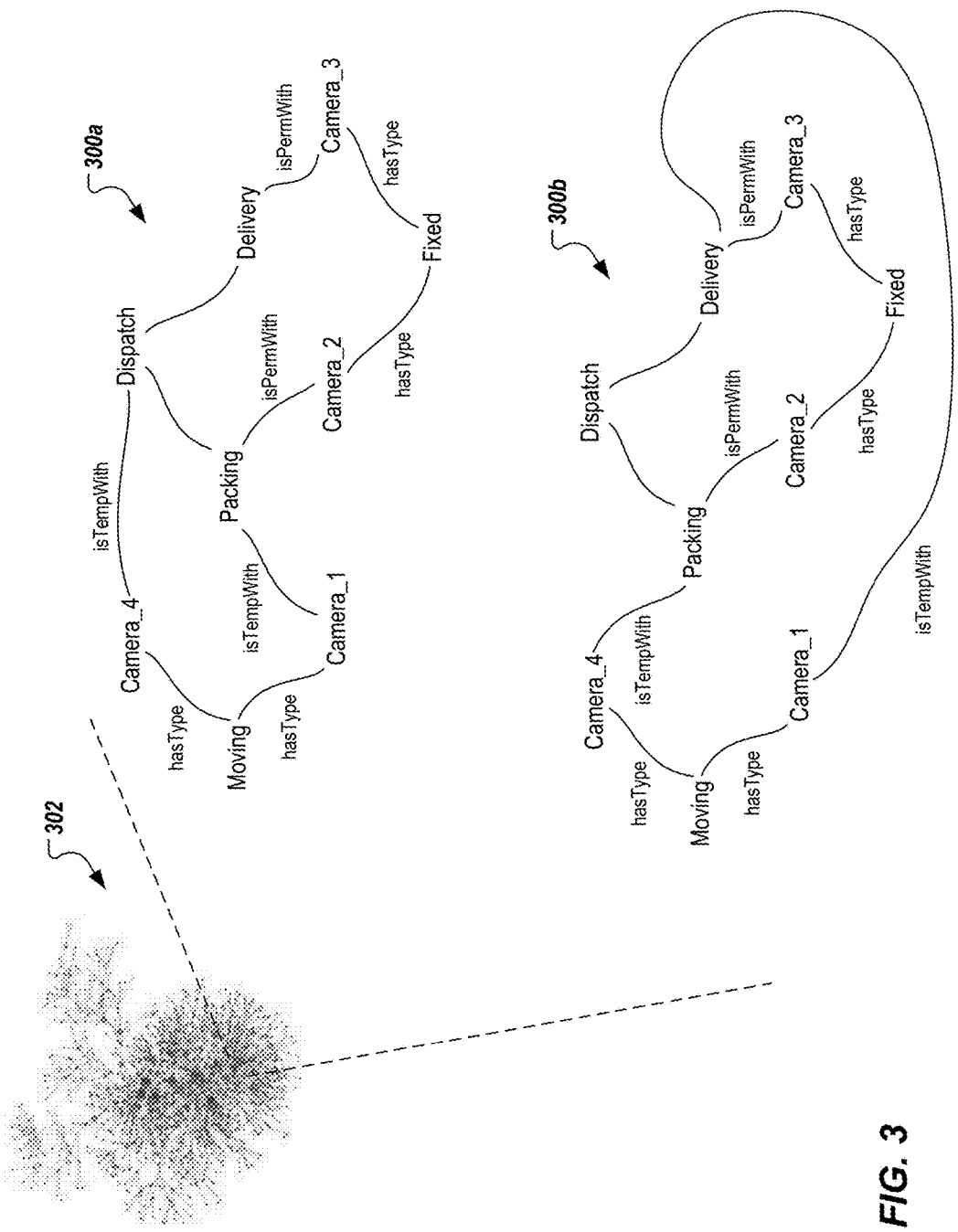
FIG. 3 depicts example portions of an example knowledge graph.

FIG. 3 depicts example portions 300a, 300b of a knowledge graph 302, which represents at least a portion of the devices of a monitoring system. In the example of FIG. 3, concepts corresponding to the example context are provided as nodes, and relationships between concepts are provided as edges. Example concepts include components of the monitoring system (e.g., cameras), types of components (e.g., moving, fixed), and locations within the environment (e.g., dispatch, packing, delivery).

The example portions 300a, 300b represent respective temporal relationships between concepts. For example, the example portion 300a corresponds to a first time, or first time range, and the example portion 300b corresponds to a second time, or second time range. In the depicted example, Camera_1, and Camera_4 are both moving cameras (e.g., mobile between locations within the environment), and Camer_2 and Camera_3 are both fixed (e.g., permanently monitoring respective locations within the environment). With reference to the example portion 300a, at the first time, or within the first time range, Camera_1 monitors the packing location, and Camera_4 monitors the dispatch location, while Camera_2 and Camera_4 respectively monitor the packing location and the delivery location. With reference to the example portion 300b, at the second time, or within the second time range, Camera_1 monitors the delivery location, and Camera_4 monitors the packing location, while Camera_2 and Camera_4 respectively monitor the packing location and the delivery location.

In accordance with implementations of the present disclosure, recorded data is provided from a monitoring system (e.g., as at least a portion of the input data 214 of FIG. 2) that monitors an environment, and a knowledge graph is provided, which represents a map of the environment in spatial and/or temporal relation to components (e.g., cameras) of the monitoring system. A computer-vision model is provided, which processes recorded data (e.g., images), and applies labels to the recorded data. In some examples, the labels correspond to activities, and/or objects captured in the recorded data. A reinforcement learning model is provided, which identifies one or more cameras that may be relevant at a given time. In some examples, reinforcement is based on structured user feedback that indicates one or more sequences of data (e.g., images) that are relevant to a particular inquiry (e.g., movement of a package through the environment).

An output is provided (e.g., as at least a portion of the output data 216 of FIG. 2), which captures a sequence of events. In some examples, the output is provided as a sequence graph with each node in the graph corresponding to an instance of recorded data (e.g., an image), and an associated timestamp (e.g., a time/date, at which the image was captured). Each node is associated with a description that provides one or more activities captured in the respective image. In some examples, the first node corresponds to a first instance of the event occurring (e.g., the first time an object appears in the recorded data), and the last node corresponds to a last instance of the event occurring (e.g., the last time the object appears in the recorded data).

In some implementations, recorded data (e.g., video with, or without audio) is provided from the monitoring system. For example, the monitoring system 120 of FIG. 1 provides recorded data to the sequence generation platform 202 of FIG. 2 as the input data 214. In some examples, the input data 214 is provided as sets of recorded data, each set of recorded data corresponding to a component (e.g., camera) of the monitoring system. For example, sets of recorded data (D) (e.g., images) for n cameras can be provided as:

$D_{C1}, D_{C2}, \ldots, D_{Cn}$

Each camera corresponds to a concept recorded in the knowledge graph (e.g., see FIG. 3, and discussion above). In this manner, the spatial and/or temporal relation of each camera to the environment is known. For example, at a first time it can be determined from the knowledge graph 302 that Camera_4 is monitoring Dispatch, and at a second time, Camera_4 is monitoring Packing. Accordingly, each set of recorded data can be associated with metadata indicating the relation within the environment (e.g., $D_{C2} \rightarrow$Camera_2 in Packing).

In some implementations, each set of recorded data includes data recorded over a time period m (e.g., seconds). In some examples, the time period can be provided to the sequence generation platform 202. For example, a user can provided input (e.g., included in the input data 214), from which the time period can be determined (e.g., input that instructs the sequence generation platform 202 to analyze the recorded data from a first timestamp to a second timestamp, corresponding to a time range, within which an event is expected to have occurred).

In some implementations, for each set of recorded data, one or more features are identified within images (e.g., frames of video data). This can be referred to as feature extraction, which can be performed by the feature extraction module 204 of FIG. 2. An example feature includes an object, such as a product, moving through the environment, and/or an activity occurring within the environment.

In further detail, feature extraction can be performed (e.g., by the feature extraction module 204 of FIG. 2) using a computer-vision model. In some examples, the computer-vision model is a ML model that is trained based on historic data. In the present context, the historic data can include images of objects, and/or activities occurring within the environment. In some implementations, the computer-vision model is provided as a neural network. In general, a neural network includes an input layer, an output layer, and multiple hidden layers between the input layer and the output layer. Each layer includes one or more nodes that are connected with one or more nodes of another layer. In some examples, connections between nodes are established, and strengthened (weighted) based on training of the neural network (e.g., also referred to as learning). In some implementations, the neural network is a convolution neural network (CNN). In some examples, the CNN is based on an explicit assumption that the input data is exclusively image data, which gains efficiencies in processing, and reduces the number of parameters within the CNN. Feature extraction using neural networks, such as CNNs is known in the art. Consequently, a detailed discussion of processing images through a CNN to identify features in images is presently foregone.

In some implementations, an output of the feature extraction (e.g., of the feature extraction module 204) includes multiple feature sets (e.g., a feature set for each image) that are aggregated into a multi-dimensional data set. In some implementations, the multi-dimensional data set includes dimensions of components (e.g., cameras), time (images), and features. Accordingly, each data point in the multi-dimensional data set corresponds to a component, a time, and a feature (e.g., object), if any, recorded in the image associated with the component and time. In short, the multi-dimensional data set records features recorded by which cameras, and when.

In accordance with implementations of the present disclosure, the multi-dimensional data set is provided as input for activity detection, and reinforcement learning. For example, the feature extraction module 204 provides the multi-dimensional data set as input to the activity detector module 206, and the reinforcement learning module 210. In some implementations, activity detection includes analysis of respective dimensional slices of the multi-dimensional data set. In some examples, each dimensional slide is a two-dimensional slice corresponding to a respective feature (e.g., object activity), the two-dimensional slice including a component dimension, and a time (image) dimension. In short, each dimensional slice is a matrix of components (e.g., cameras), and data (e.g., images) for each feature (e.g., object).

In some implementations, each dimensional slice is analysed to identify a feature as a particular type of feature within one or more images. For example, the feature extraction, described above, can indicate that a feature is present in an image, and the dimensional slice is analysed to determine the specific type of feature (e.g., a package that is recorded in the image).

In some implementations, output of the activity detection includes a set of vectors, each vector corresponding to a feature of an image, and one or more labels assigned to the feature, each label including a respective confidence score indicating a likelihood that the feature indeed corresponds to the respective label. For example, labels can correspond to respective activities, and a vector can indicate the likelihood of a feature corresponding to the activities (e.g., dispatched, 0.6; removed, 0.1; opened, 0.05). The set of vectors is provided for reinforcement learning. For example, the activity detector model 206 provides the set of vectors to the reinforcement learning module 210.

In some implementations, reinforcement learning is performed to identify one or more components (e.g., cameras) that may be relevant at a given time, and is based on structured user feedback that indicates one or more sequences of data (e.g., images) that are relevant to a particular inquiry (e.g., movement of a package through the environment). The reinforcement learning provides an output that includes a sequence of components (e.g., cameras). For example, the reinforcement learning module 210 provides output to the graph builder module 208.

An example reinforcement learning is described with reference to FIG. 4, which depicts an example sequence provided from a set of cameras of a monitoring system. In the depicted example, a set of cameras provides respective images 400 (e.g., frames), with images capturing a feature (e.g., object). In some implementations, a policy is provided based on user input (e.g., provided to the reinforcement learning module 210 as at least a portion of the input data 214). In some examples, the user input can be provided as an expected sequence of images (e.g., a sequence of cameras). For example, the user input can define an expected sequence of images for an object moving through the environment. With reference to FIG. 1, an expected sequence can correspond to expected movement of the object 150 through the locations 122, 124, 126, 128. An example sequence can include movement from manufacture, to assembly, to storage, back to assembly, then to shipping. Consequently, an expected sequence of images can be from camera 132, from camera 134, from camera 136, from camera 134, and from camera 138.

Figure 4:
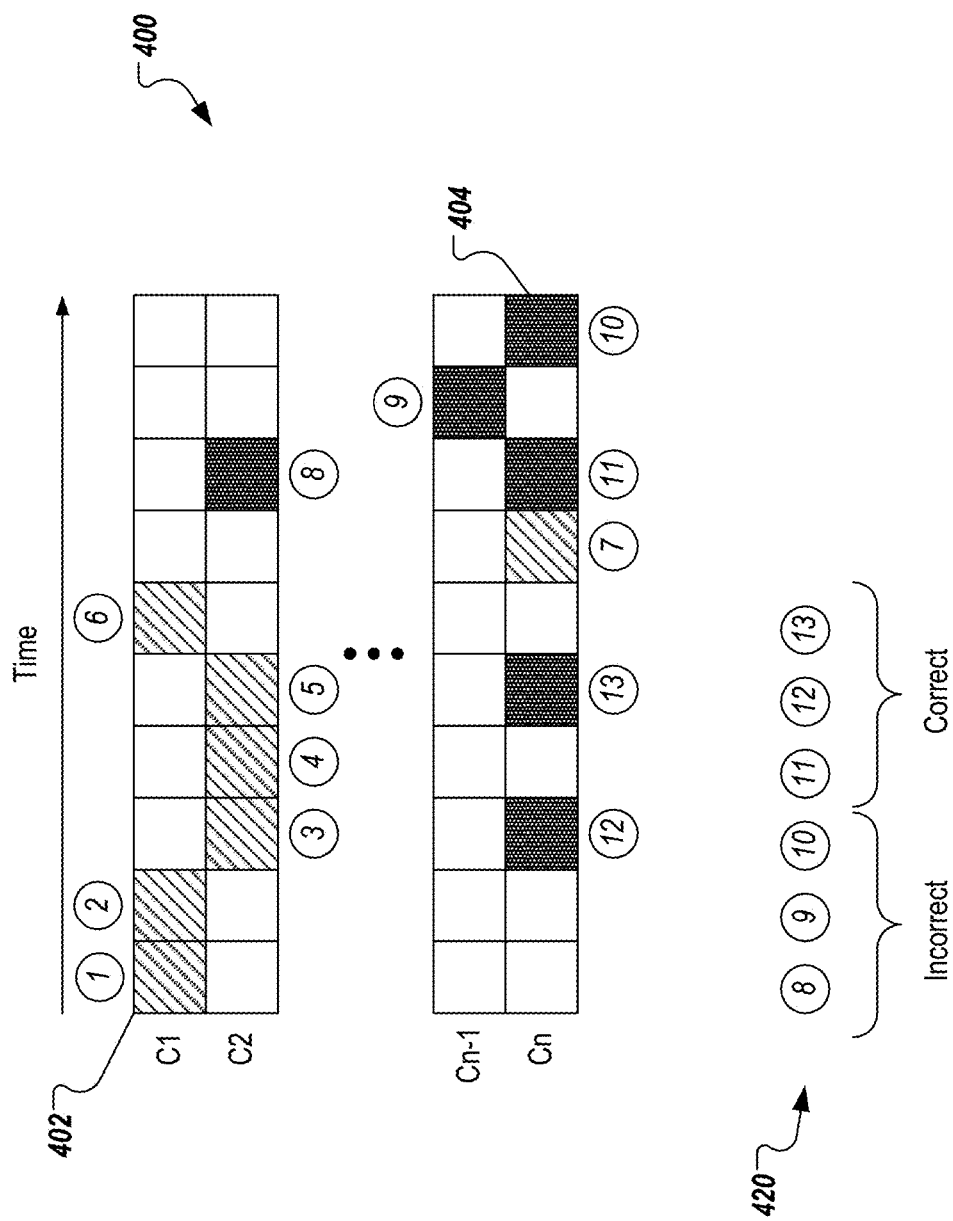
FIG. 4 depicts an example sequence provided in accordance with implementations of the present disclosure.

With reference to the example of FIG. 4, the user input can include a sequence of 1, 2, 3, 4, 5, 6, 7, which is used to train a policy. The policy corresponds to the images 402 of FIG. 4. The policy can be used with the recorded data, and information form the knowledge graph to provide a sequence of cameras for the recorded data currently considered. Using the example of FIG. 4, an example sequence 420 can include 8, 9, 10, 11, 12, and 13, corresponding to the images 404 of FIG. 4 (e.g., the cameras C2, Cn−1, and Cn capturing images 404 of an object of interest). In some examples, the example sequence is based on the relationship between cameras, and locations provided from the knowledge graph.

In accordance with implementations of the presentation, the knowledge graph indicates which cameras cover which areas. The coverage might be permanent or temporal depending on the nature of cameras. In some examples, the sequence of events is identified by following the logic of the knowledge graph (e.g., from packing to dispatching, and then to delivery area). The sequencing of activities is coded in the knowledge graph. The graph is responsible to evaluate the consistency of potential sequences (guided by the areas, and streamed by the static/dynamic cameras). For example, the knowledge graph encodes that moving from packing to delivery is impossible (inconsistent), because of physical limitation (e.g., dispatching area is monitored; anything moving from packing to delivery would have been noticed in the dispatching area by following the knowledge graph logic).

In some examples, the sequence is provided for display to a user, and the user provides user input indicating whether the sequence is accurate. In the example of FIG. 4, the user input indicates that the 8, 9, 10 portion of the example sequence 420 is incorrect, while the 11, 12, 13 portion of the example sequence 420 is correct.

In accordance with implementations of the present disclosure, the user input is provided as feedback for reinforcement learning, which improves the prediction of sequences. Reinforcement learning can be performed based on a reward paradigm, in which a policy ($\pi$) is learned that maximizes a reward value. In some examples, the reward value is incremented (e.g., by 1), if a predicted value (e.g., a camera in the sequence) is correct, and the reward value remains static (or can be decremented), if a predicted value is incorrect. For the example sequence 420 of FIG. 4, the reward value can be provided as three (3) (e.g., 3 cameras were correct of the 6 cameras provided in the sequence). Accordingly, the policy can be adjusted, such that the sequence portion 8, 9, 10 is weighted not precede the sequence portion 11, 12, 13 in future sequences.

In some examples, the policy can provide a series of probabilities representing a likelihood of a subsequent camera in the sequence given a current camera. For example, if a first camera is identified in a sequence (e.g., an object of interest is detected in an image provided by the first camera at a first time), a next camera in the sequence can be determined based on respective probabilities for a plurality of cameras. In some examples, the probability is determined based on the feature (e.g., object, activity). For example, for a given camera $C_i$, and a given feature, a next camera $C_{i+1}$ in the sequence can be determined based on associated probabilities. In some examples, a set of cameras can include associated probabilities: $C_1$, $P_1$; $C_2$, $P_2$; . . . ; $C_n$, $P_n$. In some examples, the associated probabilities are dependent upon the feature being considered. For example, for a first feature (e.g., an object), $P_1$ can include a first value, and for a second feature (e.g., an activity) $P_1$ can include a second value, different from the first value. In some implementations, the camera having the highest probability is selected as the next camera in the sequence.

Accordingly, the reinforcement learning provides a sequence of cameras (images) as output for provision of a graph. For example, the reinforcement learning module 210 provides the sequence to the graph builder module 208. In some implementations, the graph builder module 208 provides each camera in the sequence as a node with edges between nodes representing temporal order. Each node is associated with the image provided from the respective camera, the image capturing a feature (e.g., object, activity). Each node is associated with a description based on information recorded in the knowledge graph. In some examples, the description of a node is provided as a location that the respective camera relates to in the knowledge graph.

Figure 5:
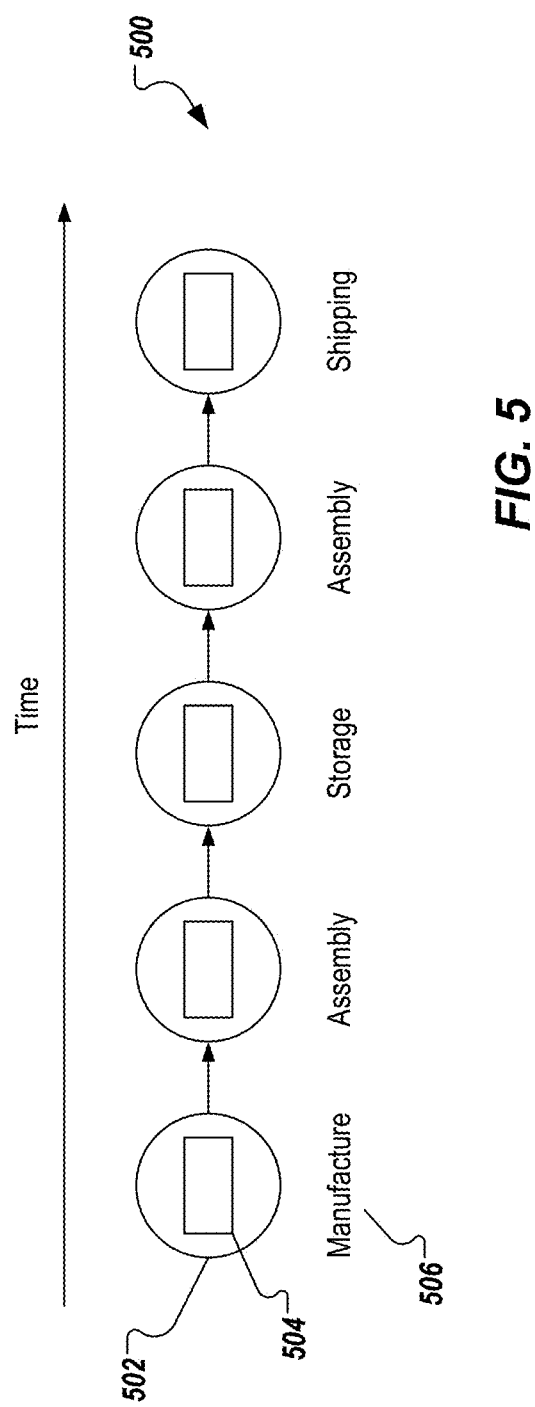
FIG. 5 depicts an example graph in accordance with implementations of the present disclosure.

FIG. 5 depicts an example graph 500 in accordance with implementations of the present disclosure. The example graph 500 includes nodes 502, each node 502 corresponding to a camera and having an image 504 and description 506 associated therewith. Accordingly, the example graph 500 provides a summary from a larger body of recorded data, the summary representing a temporal sequence of a feature within the environment, and providing recorded data (e.g., images) in temporal order. In the example of FIG. 5, the example graph 500 indicates that a feature of interest (e.g., an object) moves through the environment from manufacture, to assembly, to storage, to assembly, and to shipping, providing recorded data (images) as evidence for each step in the sequence.

Figure 6:
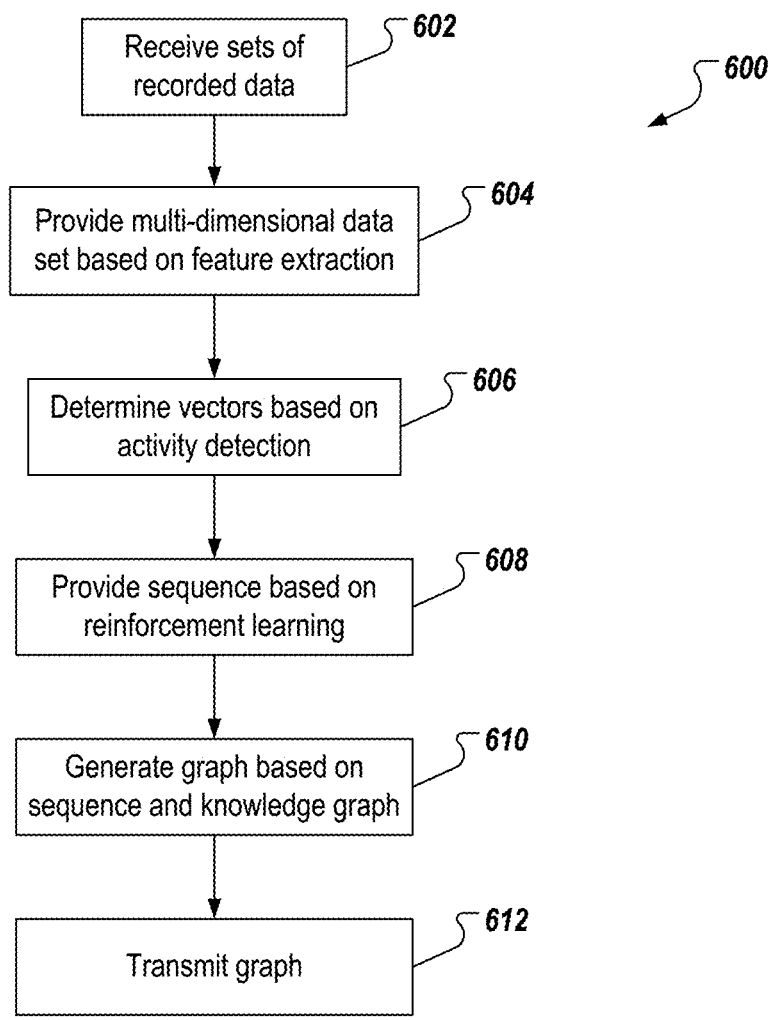
FIG. 6 depicts an example process that can be executed in implementations of the present disclosure.

FIG. 6 depicts an example process 600 that can be executed in implementations of the present disclosure. In some examples, the example process 600 is provided using one or more computer-executable programs executed by one or more computing devices (e.g., the back-end system 108 of FIG. 1). The example process 600 can be executed to provide a sequence of data, and respective descriptions from a body of data recorded by a multi-device monitoring system, as described herein.

One or more sets of recorded data are received (602). For example, the sequence generation platform 202 of FIG. 2 receives the sets of recorded data as the input data 214 (e.g., from the monitoring system 120 of FIG. 1). A multi-dimensional data set is provided based on feature extraction (604). For example, the feature extraction module 204 processes at least a portion of the input data 214 to perform feature extraction, and provide the multi-dimensional data set, as described herein. One or more vectors are determined based on activity detection (606). For example, the activity detector module 206 provides the one or more vectors based on the multi-dimensional data set, as described herein.

A sequence is provided based on reinforcement learning (608). For example, the reinforcement learning module 210 provides the sequence based on the one or more vectors, and the multi-dimensional data set, as described herein. A graph is generated based on the sequence and the knowledge graph (610). For example, the graph builder module 208 provides a graph (e.g., the example graph 500 of FIG. 5) based on the sequence, and the knowledge graph, as described herein. The graph is transmitted (612). For example, the sequence generation platform 202 provides the graph as at least a portion of the output data 216. In some examples, the graph is transmitted for display to a user on a computing device.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing a sequence of data, and respective descriptions from a body of data recorded by a multi-device monitoring system, the method being executed by one or more processors and comprising:

receiving, by the one or more processors, at least a portion of a multi-dimensional data set corresponding to data recorded by the multi-device monitoring system, the multi-dimensional data set comprising, for each device in a set of devices of the multi-device monitoring system, a feature set over a respective time period and over devices in the set of devices, the multi-dimensional data set being provided based on feature extraction by processing the recorded data using a machine learning (ML) model;

processing, by the one or more processors, the at least a portion of multi-dimensional data to identify sets of features recorded by respective devices in the set of devices of the multi-device monitoring system;

comparing, by the one or more processors, a feature set of a first device relative to a feature set of a second device in a location dimension to determine that a first feature in the feature set of the first device corresponds to a second feature in the feature set of the second device;

providing, by the one or more processors, a sequence of feature sets by selecting appropriate feature sets from the multi-dimensional data set based on the comparison, the sequence providing an order of progress of an object between the feature sets of the set of devices; and generating, by the one or more processors, a graph comprising a plurality of nodes, each node corresponding to a location, and including respective recorded data and a description.

2. The method of claim 1, wherein the ML model is provided as a convolution neural network (CNN).

3. The method of claim 1, wherein providing the sequence comprises identifying a subsequent device based on a device, and a set of potential subsequent devices, each potential subsequent device being associated with a probability.

4. The method of claim 1, wherein the feature set of the first device is compared relative to the feature set of the second device in a time dimension to determine that a first feature in the feature set of the first device corresponds to a second feature in the feature set of the second device.

5. The method of claim 1, wherein the feature set of the first device is compared relative to the feature set of the second device using a machine learning technique.

6. The method of claim 1, further comprising determining a location of the first device relative to a location of the second device using a knowledge graph.

7. The method of claim 1, wherein the respective recorded data comprises an image captured by a respective device at the location.

8. The method of claim 1, wherein the description is determined from the knowledge graph, and indicates the location.

9. A non-transitory computer-readable storage medium coupled to one or more processors and having instructions stored thereon which, when executed by the one or more processors, cause the one or more processors to perform operations for providing a sequence of data, and respective descriptions from a body of data recorded by a multi-device monitoring system, the operations comprising:

receiving at least a portion of a multi-dimensional data set corresponding to data recorded by the multi-device monitoring system, the multi-dimensional data set comprising, for each device in a set of devices of the multi-device monitoring system, a feature set over a respective time period and over devices in the set of devices, the multi-dimensional data set being provided based on feature extraction by processing the recorded data using a machine learning (ML) model;

processing the at least a portion of multi-dimensional data to identify sets of features recorded by respective devices in the set of devices of the multi-device monitoring system;

comparing a feature set of a first device relative to a feature set of a second device in a location dimension to determine that a first feature in the feature set of the first device corresponds to a second feature in the feature set of the second device;

providing a sequence of feature sets by selecting appropriate feature sets from the multi-dimensional data set based on the comparison, the sequence providing an order of progress of an object between the feature sets of the set of devices; and generating a graph comprising a plurality of nodes, each node corresponding to a location, and including respective recorded data and a description.

10. The computer-readable storage medium of claim 9, wherein the ML model is provided as a convolution neural network (CNN).

11. The computer-readable storage medium of claim 9, wherein providing the sequence comprises identifying a subsequent device based on a device, and a set of potential subsequent devices, each potential subsequent device being associated with a probability.

12. The computer-readable storage medium of claim 9, wherein the feature set of the first device is compared relative to the feature set of the second device in a time dimension to determine that a first feature in the feature set of the first device corresponds to a second feature in the feature set of the second device.

13. The computer-readable storage medium of claim 9, wherein the feature set of the first device is compared relative to the feature set of the second device using a machine learning technique.

14. The computer-readable storage medium of claim 9, wherein operations further comprise determining a location of the first device relative to a location of the second device using a knowledge graph.

15. The computer-readable storage medium of claim 9, wherein the respective recorded data comprises an image captured by a respective device at the location.

16. The computer-readable storage medium of claim 9, wherein the description is determined from the knowledge graph, and indicates the location.

17. A system, comprising:
one or more processors; and
a computer-readable storage device coupled to the one or more processors and having instructions stored thereon which, when executed by the one or more processors, cause the one or more processors to perform operations for providing a sequence of data, and respective descriptions from a body of data recorded by a multi-device monitoring system, the operations comprising:
receiving at least a portion of a multi-dimensional data set corresponding to data recorded by the multi-device monitoring system, the multi-dimensional data set comprising, for each device in a set of devices of the multi-device monitoring system, a feature set over a respective time period and over devices in the set of devices, the multi-dimensional data set being provided based on feature extraction by processing the recorded data using a machine learning (ML) model;
processing the at least a portion of multi-dimensional data to identify sets of features recorded by respective devices in the set of devices of the multi-device monitoring system;
comparing a feature set of a first device relative to a feature set of a second device in a location dimension to determine that a first feature in the feature set of the first device corresponds to a second feature in the feature set of the second device;
providing a sequence of feature sets by selecting appropriate feature sets from the multi-dimensional data set based on the comparison, the sequence providing an order of progress of an object between the feature sets of the set of devices; and
generating a graph comprising a plurality of nodes, each node corresponding to a location, and including respective recorded data and a description.

18. The system of claim 17, wherein the ML model is provided as a convolution neural network (CNN).

19. The system of claim 17, wherein providing the sequence comprises identifying a subsequent device based on a device, and a set of potential subsequent devices, each potential subsequent device being associated with a probability.

20. The system of claim 17, wherein the feature set of the first device is compared relative to the feature set of the second device in a time dimension to determine that a first feature in the feature set of the first device corresponds to a second feature in the feature set of the second device.

21. The system of claim 17, wherein the feature set of the first device is compared relative to the feature set of the second device using a machine learning technique.

22. The system of claim 17, wherein operations further comprise determining a location of the first device relative to a location of the second device using a knowledge graph.

23. The system of claim 17, wherein the respective recorded data comprises an image captured by a respective device at the location.

24. The system of claim 17, wherein the description is determined from the knowledge graph, and indicates the location.

* * * * *